(12) United States Patent
Woods

(10) Patent No.: US 6,833,933 B1
(45) Date of Patent: Dec. 21, 2004

(54) STOCHASTIC SCREENS FOR PRINTING

(75) Inventor: Michael Woods, Wantage (GB)

(73) Assignee: Software 2000 Limited, Oxford (GB)

( * ) Notice: Subject to any disclaimer, the term of this patent is extended or adjusted under 35 U.S.C. 154(b) by 0 days.

(21) Appl. No.: 09/577,011

(22) Filed: May 24, 2000

(30) Foreign Application Priority Data

Jul. 2, 1999 (GB) .............................................. 9915365

(51) Int. Cl.⁷ .............................................. G06K 15/00
(52) U.S. Cl. ...................... 358/3.14; 358/3.28; 358/1.9; 358/1.2; 358/3.23; 358/3.19; 358/3.3
(58) Field of Search ........................... 358/1.2, 1.6, 1.8, 358/501, 518, 534, 535, 429, 3.23, 3.24, 3.3, 3.14, 3.19, 1.9, 3.28

(56) References Cited

U.S. PATENT DOCUMENTS

| | | | |
|---|---|---|---|
| 5,555,475 A | * 9/1996 | Perowne et al. | 358/462 |
| 5,701,366 A | * 12/1997 | Ostromoukhov et al. | 382/237 |
| 5,734,752 A | * 3/1998 | Knox | 358/3.28 |
| 5,740,279 A | * 4/1998 | Wang et al. | 382/237 |
| 5,790,703 A | * 8/1998 | Wang | 358/3.28 |
| 6,031,626 A | * 2/2000 | Shu et al. | 358/1.9 |
| 6,507,666 B1 | * 1/2003 | De La Torre | 382/167 |

FOREIGN PATENT DOCUMENTS

| | | | | |
|---|---|---|---|---|
| EP | 0 199 469 A2 | 10/1986 | | H04N/1/40 |
| EP | 0 401 023 A2 | 12/1990 | | H04N/1/40 |
| EP | 0593304 A2 | * 10/1993 | | H04N/2/40 |
| EP | 0 593 304 A2 | 4/1994 | | H04N/1/40 |
| EP | 0 665 673 A2 | 8/1995 | | H04N/1/405 |
| EP | 0734149 A2 | * 9/1996 | | H04N/1/405 |
| EP | 0 828 379 A2 | 3/1998 | | H04N/1/405 |
| EP | 0 734 149 A3 | 7/1998 | | H04N/1/407 |

* cited by examiner

*Primary Examiner*—Kimberly Williams
*Assistant Examiner*—Negussie Worku
(74) *Attorney, Agent, or Firm*—Arent Fox PLLC

(57) ABSTRACT

A method of generating a stochastic screen for use in printing a halftone containing image on a surface, where the generated stochastic screen comprises an array of threshold values each of which represents a halftone threshold at which pixels are printed at the corresponding location. The method comprises a) entering a first threshold value into the array and b) for a first halftone level, defining a number of threshold values to be entered into the array and, for each threshold value to be placed, for each of a number of candidate locations in the array, computing a distance function between the candidate location and the locations of threshold values already placed into the array, and placing the threshold value into the array at a location for which the distance function is substantially minimized. The process of step b) is then repeated for each subsequent halftone level.

20 Claims, 3 Drawing Sheets

| 64 | 1  | 56 | 9  | 62 | 3  | 54 | 11 |
|----|----|----|----|----|----|----|----|
| 32 | 48 | 24 | 40 | 30 | 46 | 22 | 38 |
| 52 | 16 | 60 | 8  | 50 | 14 | 58 | 6  |
| 20 | 36 | 28 | 44 | 18 | 34 | 26 | 42 |
| 61 | 4  | 53 | 12 | 63 | 2  | 55 | 10 |
| 29 | 45 | 21 | 37 | 31 | 47 | 23 | 39 |
| 49 | 13 | 57 | 5  | 51 | 15 | 59 | 7  |
| 17 | 33 | 25 | 41 | 19 | 35 | 27 | 43 |

Figure 1

STOCHASTIC SCREENS FOR PRINTING

FIELD OF THE INVENTION

The present invention relates to stochastic screens for printing and more particularly to a method for generating stochastic screens.

BACKGROUND TO THE INVENTION

Ever since the introduction of printing centuries ago, the representation of shades has presented a particular challenge to printers. The problem is simple: most printers cannot vary the strength of ink laid down at any given point on the paper, yet many candidates for printing require varying tonal quality to represent the original image.

The solution generally employed is to print a mixture of inked and non-inked areas sufficiently close together that the viewer does not perceive the separate areas but instead sees a uniform area of a tone that is a mixture of the ink and the paper tones. Commonly, this technique is termed halftoning. It has been used from earliest times in wood-block prints, down to the present day computer laser and ink-jet printers.

With halftoning there is a loss of spatial resolution. Therefore, the ideal halftone patterns would mix ink and paper areas very finely to preserve as much spatial detail as possible. However, most printing technology is not capable of printing very fine dots of ink. There will be a certain minimum size of ink dot below which the ink does not fix reliably to the paper. Also, there may be a certain variation in the quantity of ink laid down around the margin of the dot, requiring a certain minimum area of ink to reduce the variation to acceptable levels. Thus, there is usually a compromise between fine mixing to preserve spatial resolution and coarse mixing to give reliable halftones.

Traditionally the areas of ink have been arranged in regular (or ordered) patterns. However, if the areas are fine enough it is possible to arrange them in irregular patterns.

The terms ordered screen and stochastic screen are applied here respectively to these two approaches. Each approach introduces some "noise" (that is, distortion) to the original image when imposing the halftone patterns. Characteristically, ordered screens add a uniform noise at the frequency of the pattern, whereas stochastic screens, due to their irregular nature, can add noise at many different frequencies. The challenge in producing a stochastic screen is to avoid introducing noise at the lower, more noticeable frequencies.

For our purposes a screen is implemented as a two dimensional grid of values such as is illustrated in FIG. 1. Each value within the grid determines the halftones for which a dot will be placed on the paper. This is achieved by comparing the tonal value of each point (or picture element, or pixel) of the image with the corresponding grid value and printing a dot, or not, depending on which is the larger value. In other words, the screen value gives the tone threshold at which the dot is turned on.

This approach ensures that patterns do not "shift" and change between different tones, which could introduce unintentional noise. However, it also places a constraint on the arrangement of dots in each successive halftone as it "inherits" an initial pattern from its predecessor.

The grid is of arbitrary size though it is preferable to have the same number of dots turned on at each halftone.

To apply the screen across an image of arbitrary size, the grid is tiled to cover the whole image surface.

SUMMARY OF THE INVENTION

According to a first aspect of the present invention there is provided a method of generating a method of generating a stochastic screen for use in printing a halftone containing image on a surface, where the generated stochastic screen comprises an array of threshold values each of which represents a halftone threshold at which pixels are printed at the corresponding location, the method comprising:

a) entering a first threshold value into the array;
b) for a first halftone level, defining a number of threshold values to be entered into the array and, for each threshold value to be placed,
   for each of a number of candidate locations in the array, computing a distance function between the candidate location and the locations of threshold values already placed into the array, and placing the threshold value into the array at a location for which the distance function is substantially minimised, and
c) repeating step b) for each subsequent halftone level.

In certain embodiments of the present invention, said distance function incorporates a weighting function which acts to increase the contribution to the distance function of threshold values close to the candidate location at the expense of threshold values further from the candidate location. Preferably, the weighting function acts to exclude threshold values placed outside a predefined radius R from the candidate location, from the distance function calculation.

According to a second aspect of the present invention there is provided a method of printing an image on a surface, the method comprising mapping one or more stochastic screens, generated according to the method of the above first aspect of the invention, to the surface, and printing a pixel onto the surface only if the halftone value of the pixel exceeds the halftone threshold value at the equivalent location in a mapped stochastic screen.

According to a second aspect of the present invention there is provided a data storage medium having stored thereon a computer program which when run on a computer provides a driver for driving a printer coupled to the printer, the driver comprising one or more stochastic screens generated using the method of the above first aspect of the invention.

BRIEF DESCRIPTION OF THE DRAWINGS

FIG. 1 illustrates an ordered halftone printing screen grid;

DETAILED DESCRIPTION OF CERTAIN EMBODIMENTS

There are many ways to generate an irregular, stochastic screen. However, the basis of the method proposed here is to place each screen value into the screen grid in turn in a place that is suitable, so that when all values have been defined the screen will exhibit good qualities.

The two qualities that are considered good are:
1) each halftone has dots distributed in a fairly uniform manner;
2) each halftone does not contain discernible patterns, either within the grid or across tiled grid boundaries.

Therefore, the algorithm that determines dot placement needs to include factors that bias the placement in favour of these two qualities.

Figure 2:
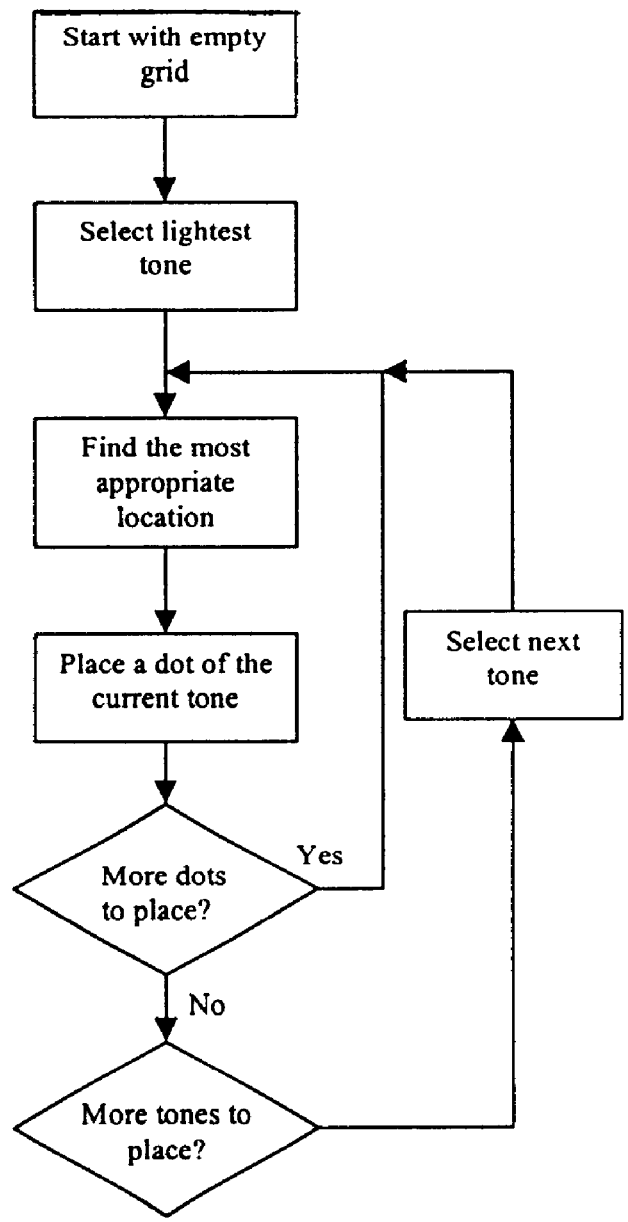
FIG. 2 is a simplified flow diagram for generating a stochastic screen.

The basic algorithm for generating the screen is illustrated by the flow diagram of FIG. 2.

Therefore, it can be seen that the dot placement algorithm is key to this method of generation. The algorithm used here is called the "distance function".

For any two points ($P_1$ and $P_2$) in the screen grid it is possible to calculate a distance value (D) between them. This may be expressed $$D = f(P_1, P_2)$$

Appropriate functions are discussed later. However, whichever is used it is important that the distance measured is the shortest between the points, remembering that the grid is tiled. For example, if one point is near the left edge and the other is near the right edge, the shortest distance will be between the points on neighbouring tiles.

Therefore, for any candidate point (Pc) for a dot it is possible to calculate a distance weight (W) that is the sum of the distances from all existing dots (n) to the candidate.

$$W = \sum_{i=1 \ldots n} f(P_i, P_c)$$

As the resulting patterns are to be uniform, it can be seen that the algorithm should choose the candidate that has the smallest W.

Where there are two or more candidates with the same W one should be selected at random. This is important as selecting a particular candidate (such as the first or last found) will bias the generated pattern according to the order in which the candidates are visited. This in turn can lead to edge patterns when tiling the screen. However, the algorithm described so far does not meet the second criterion for quality. In fact it will always produce a regular pattern (that is, an ordered screen). Two possible solutions are discussed below.

Random Candidate Selection

The simplest way to introduce irregularity into the pattern is to find more than one candidate (with different values of W) and then choose one at random. However, this method makes it difficult to control the amount of disruption introduced.

Candidate Neighbourhood

An alternative to random selection is to calculate W for only a region surrounding the candidate. This may be achieved by using a distance function that tends to zero at a given distance. An additional constraint is that a point cannot be a candidate if its distance weight is zero. This approach takes advantage of the phenomenon that low frequency regularities in a printed image tend to be less apparent to a viewer than high frequency regularities. The latter can therefore be ignored (or given less emphasis) when generating a stochastic screen.

The effect of this partial knowledge is to distort the early halftone patterns, which has a knock-on effect throughout the later halftones. It also has the useful benefit of reducing the computation required by the algorithm.

The size of neighbourhood used has a large impact on the nature of the screens generated. Likewise, varying the neighbourhood for each halftone can produce differing results. See below.

Further Consideration of the Distance Function

There are many possible distance functions that can be used in this algorithm. The choice of function has a dramatic impact on the nature and quality of the screens produced. In particular, certain categories of pattern are more obvious to the human eye, so it is preferable that the distance function bias the lines along which these patterns may fall. Likewise, care must be taken in the relative effects of near and far points as one close neighbour is usually far less desirable than many distant neighbours.

A Preferred Distance Function

As has been stated already, there are many possible distance functions and candidate neighbourhoods. This section presents the one that has produced the best results so far. The distance function is given as follows:

$$\delta X = \min(\text{abs}(X_{p2} - X_{p1}), GridWidth - \text{abs}(X_{p2} - X_{p1}))$$
$$\delta Y = \min(\text{abs}(Y_{p2} - Y_{p1}), GridHeight - \text{abs}(Y_{p2} - Y_{p1}))$$
$$D_{max} = \max(\delta X, \delta Y)$$
$$D_{min} = \min(\delta X, \delta Y)$$
$$D' = \sqrt[1.55]{D_{max}^{1.55} + \min(D_{max} - 0.1 D_{min}, D_{min})^{1.55}}$$
$$D = \frac{R - D'}{D'}$$

P1 and P2 are two points in the grid and R is the radius of the candidate neighbourhood. This somewhat contorted function produces a pleasing bias away from horizontal, vertical and diagonal patterns. D is large for near neighbours and decays to zero at the edge of the neighbourhood. It is stronger along the compass points and, to a lesser extent, along the diagonals.

The radius of the neighbourhood is varied according to the tone value being placed, using the following function:

$$R = \sqrt{\frac{30}{\pi \left( \frac{\frac{N}{2} - \text{abs}\left(t - \frac{N}{2}\right)}{N} \right)}}$$

N is the number of tones and t is current tone being generated (in the range: 0<t<N). This has the effect of encompassing large areas of the grid within the neighbourhood for the lightest halftones but reduces as the algorithm progresses towards the mid-tones. This reflects the way the dots gradually bunch towards the mid-tones. In the darker halftones the radius again opens out, for now the algorithm is more interested in the remaining holes than the dots.

Beyond the basic algorithm there are many additions that may enhance the quality of the generated screen. Some of these are considered below.

Pattern Penalties

It has already been mentioned that the distance function should bias against lines along which obvious patterns may occur. This can be extended to add penalty factors to the distance weight for introducing or extending particular patterns.

However, the introduction of penalties must be done with great care as their interaction with the distance function can lead to poor results, particularly in the mid-tone region where close knit patterns inevitably arise.

In the preferred algorithm no pattern penalties are used as none were found that produced enhanced screens. This reinforces the comment above but does not preclude the theory as experiments with other distance functions have been improved by pattern penalties (though the results were still less than those for the preferred function).

Smoothing Phase

Although each dot is added at a minimum distance weight point, early placement decisions may lead to sub-optimal placement of later dots. Therefore, there is scope to apply some smoothing phase during or at the end of each tone level.

There are many possible ways to smooth the partial screen. However, the following are important points to consider.

The smoothing should not attempt to move dots that were laid down by previous levels. Otherwise the smoothing of one halftone could destroy the quality of an earlier one.

The algorithm used in the smoothing should relate to the distance function used in the original production. If two different algorithms are used there is the distinct possibility that they will interfere to produce noise, or the placement algorithm will be overwhelmed by the smoothing. In this latter case there is little point in the original placement!

A Preferred Smoothing Algorithm

This section describes a smoothing algorithm that has improved the results of the preferred distance function.

Figure 3:
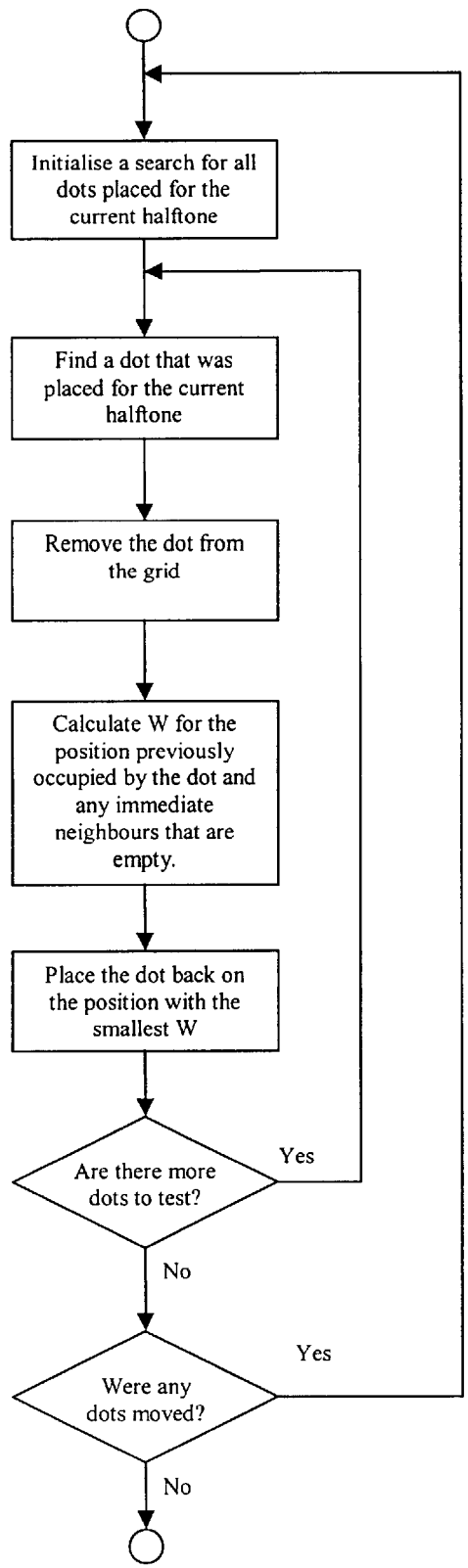
FIG. 3 is a flow diagram illustrating a method for smoothing a stochastic screen.

The smoothing algorithm is illustrated by the flow diagram of FIG. 3 and is executed at the end of placing the dots for each halftone level. The idea behind the algorithm is that, although a dot was positioned at a minimum W point originally, later dot placements may have distorted the W values around the position such that the dot would be better positioned in an immediate neighbour. The algorithm is summarised by the following:

1) For each dot added for the level
   a) Remove the dot and calculate W values for its location and all empty immediate neighbours
   b) Place the dot back in the location with the minimum W value
2) Repeat step 1) until no more moves occur Whilst this algorithm cannot deal with "structural errors" within the patterns its effect of subtly smoothing the lighter halftones has a significant benefit on the mid-tones, which otherwise can suffer from significant artefacts caused by localised clumping, which in turn is the result of poor early placement.

Comparing Different Screens

It is possible to use the distance function to produce a sum of weights (S) for each halftone level. These values can be used to compare different screens (providing they are generated with the same distance function). This opens up the possibility of following alternative branches in the decision process to produce several, or many, candidate screens that can be compared using S to find the best.

For example, consider the frequent situation where a dot may be placed in one of several positions that have equal W values. In the algorithm described above one of the positions is chosen at random. However, it is likely that the choice of position will have a qualitative effect on the resulting screen. If it is possible to calculate the "quality" of those screens, it becomes possible to pursue each position. Likewise, one might consider the alternative patterns raised by the decisions made in the smoothing algorithm.

However, as generating candidate screens is costly in processing time it is desirable to perform effective pruning of the decision tree. As each halftone level can yield an S value it is relatively simple to prune at each halftone level. The generator would need to pursue each candidate to the completion of the halftone level, then select the one that yields the best S value as the starting point for the next halftone level. Nevertheless, this will still be very costly in terms of processing power and resources, as there are likely to be many thousands of candidates for each halftone. It also cannot find screens that are poorer in the lightest tones but extremely good in the mid-tone and dark-tone regions.

This whole area of comparing screens remains speculative. At this time no development work has been done to determine if S is even a good method for determining quality. However, reason suggests that it is, for it is derived from the distance function, which has proven to be effective at generating good quality screens.

It will be appreciated by the person of skill in the art that various modifications may be made to the above described embodiment without departing from the scope of the present invention.

What is claimed is:

1. A method of generating a stochastic screen for use in printing a halftone containing image on a surface, where the generated stochastic screen comprises an array of threshold values each of which represents a halftone threshold at which pixels are printed at the corresponding location, the method comprising:
   a) entering a first threshold value into the array;
   b) for a first halftone level, defining a plurality of threshold values to be entered into the array and, for each threshold value to be placed, for each of a number of candidate locations in the array, evaluating a distance function between the candidate location and the locations of threshold values already placed into the array, and placing the threshold value into the array at a location for which the distance function is substantially minimized, and
   c) repeating the process of step b) for each subsequent halftone level.

2. A method according to claim 1, wherein said distance function incorporates a weighting function which acts to increase the contribution to the distance function of threshold values close to the candidate location at the expense of threshold values further from the candidate location.

3. A method according to claim 2, wherein the weighting function acts to exclude threshold values placed outside a predefined radius R from the candidate location, from the distance function calculation.

4. A method according to claim 3, wherein the distance function is computed based upon the shortest distances between the candidate location in question and the respective locations of a previously entered threshold values.

5. A method according to claim 3 wherein, when two or more candidate locations give rise to the same or similar minimum distance function, the location at which the threshold value is placed is selected at random from these locations.

6. A method according to claim 3 and comprising, for each halftone, completing the entry of threshold values into the array and relocating one or more threshold values of the halftone to locations which are currently empty.

7. A method according to claim 6 and comprising, for each entered threshold value of the halftone:
   evaluating said distance function for the entered threshold value based upon all other threshold values entered into the array;
   evaluating said distance functions for one or more empty locations in the vicinity of the entered threshold value;
   comparing the results and if the distance function for one of the empty locations is less than that determined for the entered location, relocating the threshold values to that empty location.

8. A method according to claim 2, wherein the distance function is computed based upon the shortest distances between the candidate location in question and the respective locations of a previously entered threshold values.

9. A method according to claim 2 and comprising, for each halftone, completing the entry of threshold values into the array and relocating one or more threshold values of the halftone to locations which are currently empty.

10. A method according to claim 9 and comprising, for each entered threshold value of the halftone:
- evaluating said distance function for the entered threshold value based upon all other threshold values entered into the array;
- evaluating said distance functions for one or more empty locations in the vicinity of the entered threshold value;
- comparing the results and if the distance function for one of the empty locations is less than that determined for the entered location, relocating the threshold values to that empty location.

11. A method according to claim 2 wherein, when two or more candidate locations give rise to the same or similar minimum distance function, the location at which the threshold value is placed is selected at random from these locations.

12. A method according to claim 1 wherein the distance function is computed based upon the shortest distances between the candidate location in question and the respective locations of a previously entered threshold values.

13. A method according to claim 12 wherein, when two or more candidate locations give rise to the same or similar minimum distance function, the location at which the threshold value is placed is selected at random from these locations.

14. A method according to claim 12 and comprising, for each halftone, completing the entry of threshold values into the array and relocating one or more threshold values of the halftone to locations which are currently empty.

15. A method according to claim 14 and comprising, for each entered threshold value of the halftone:
- evaluating said distance function for the entered threshold value based upon all other threshold values entered into the array;
- evaluating said distance functions for one or more empty locations in the vicinity of the entered threshold value;
- comparing the results and if the distance function for one of the empty locations is less than that determined for the entered location, relocating the threshold values to that empty location.

16. A method according to claim 1 wherein, when two or more candidate locations give rise to the same or similar minimum distance function, the location at which the threshold value is placed is selected at random from these locations.

17. A method according to claim 16 and comprising, for each halftone, completing the entry of threshold values into the array and relocating one or more threshold values of the halftone to locations which are currently empty.

18. A method according to claim 17 and comprising, for each entered threshold value of the halftone:
- evaluating said distance function for the entered threshold value based upon all other threshold values entered into the array;
- evaluating said distance functions for one or more empty locations in the vicinity of the entered threshold value;
- comparing the results and if the distance function for one of the empty locations is less than that determined for the entered location, relocating the threshold values to that empty location.

19. A method according to claim 1 and comprising, for each halftone, completing the entry of threshold values into the array and relocating one or more threshold values of the halftone to locations which are currently empty.

20. A method according to claim 19 and comprising, for each entered threshold value of the halftone:
- evaluating said distance function for the entered threshold value based upon all other threshold values entered into the array;
- evaluating said distance functions for one or more empty locations in the vicinity of the entered threshold value;
- comparing the results and if the distance function for one of the empty locations is less than that determined for the entered location, relocating the threshold values to that empty location.

* * * * *